United States Patent [19]

DeKoning

[11] 3,995,754
[45] Dec. 7, 1976

[54] GARBAGE VACUUM COMPACTOR DEVICE

[75] Inventor: Helen DeKoning, W. Babylon, N.Y.

[73] Assignee: Lawrence Peska Associates, Inc., New York, N.Y. ; a part interest

[22] Filed: May 1, 1975

[21] Appl. No.: 573,734

Related U.S. Application Data

[63] Continuation of Ser. No. 446,311, Feb. 27, 1974, abandoned.

[52] U.S. Cl. .............................. 214/83.26; 15/340; 214/83.28
[51] Int. Cl.² ....................................... B60P 1/60
[58] Field of Search .............. 214/41, 83.26, 83.28; 15/314, 315, 340; 232/1 R; 302/58; 138/107; 137/615

[56] References Cited

UNITED STATES PATENTS

| | | | |
|---|---|---|---|
| 2,600,538 | 6/1952 | Jackes et al. | 212/127 X |
| 3,070,243 | 12/1962 | Lippke | 214/83.28 |
| 3,468,439 | 9/1969 | Olitsky et al. | 214/77 R |
| 3,613,915 | 10/1971 | Vita | 214/83.26 X |
| 3,688,802 | 9/1972 | Bauman et al. | 214/41 X |
| 3,847,293 | 11/1974 | Boon | 214/83.28 |

*Primary Examiner*—Robert G. Sheridan

[57] ABSTRACT

An installation for a garbage truck for suctioning up garbage from cans, receptacles and pits and into the truck. It includes a large diameter flexible suction hose one end of which has a nozzle for suction intake of garbage by insertion into a garbage pit, receptacle or can, and the other end of the hose being connected to a very strong suction fan mounted on the truck, so that the garbage is suctioned up through the hose and into the chamber of the truck. Hydraulic cylinders are provided for elevating and lowering the hose and for extending and retracting it to register with the garbage pit or receptacle. Results are speed of pickup, cleanliness and low cost of operation.

1 Claim, 1 Drawing Figure

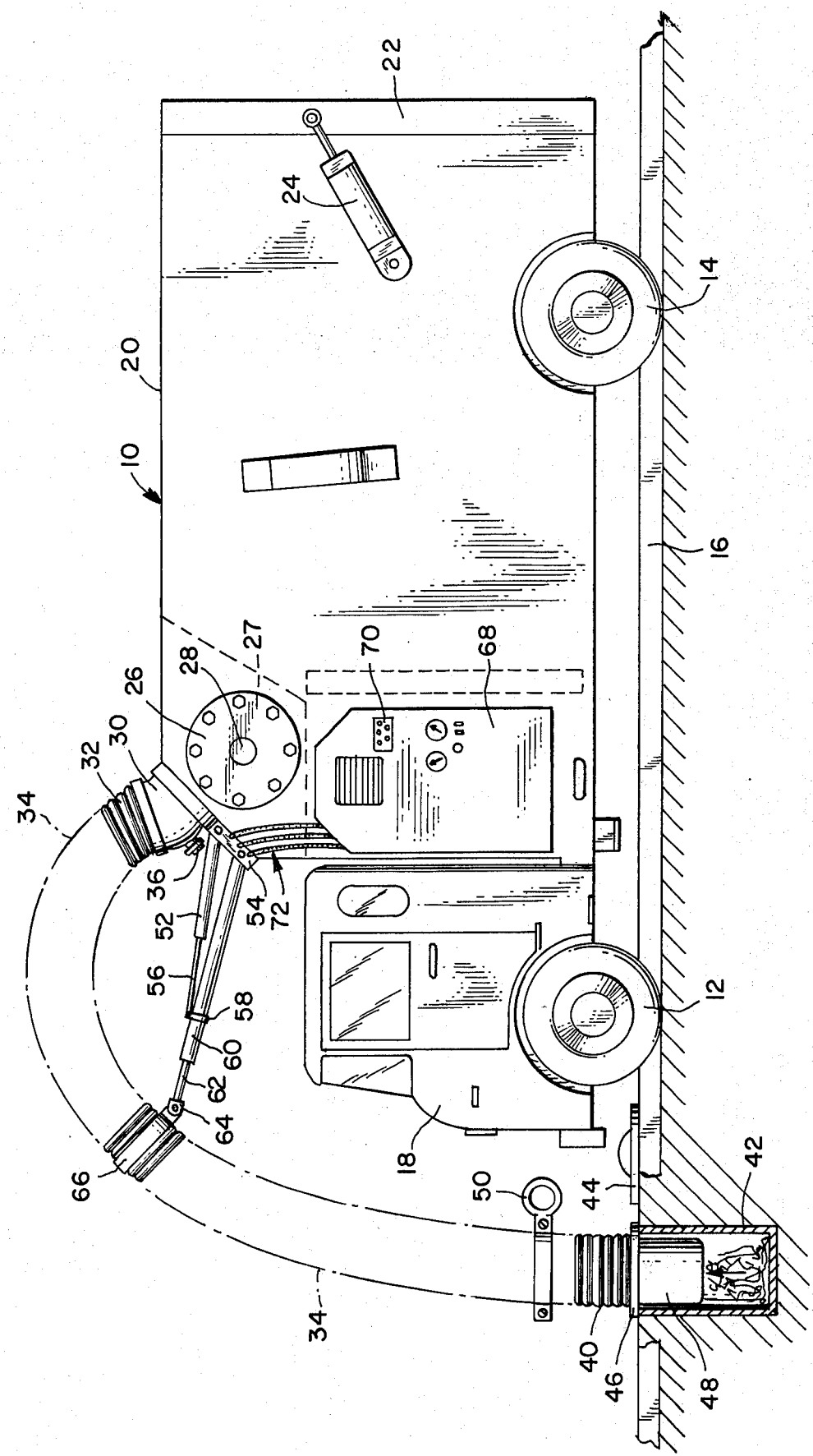

GARBAGE VACUUM COMPACTOR DEVICE

The present application is a continuation of earlier filed application, Ser. No. 446,311 filed on Feb. 27, 1974, now abandoned.

This invention relates to improvements in garbage removal and compactor devices employing vacuum suction means.

An object of the invention is to provide a novel and improved garbage handling and removal device in which vacuum suctioning means is used as a principal aid in the device.

Another object of the invention is to provide a novel and improved garbage removal truck which has a large and roomy chamber for receiving garbage and trash, and a large extensible suction tube or pipe which is extended right into a garbage can or receptacle for drawing up all the garbage right into the truck, without the need for handling the garbage cans or receptacles at all.

A further object of the invention is to provide a novel and improved garbage removal truck and accessory device in which there is a very strong vacuum suction producing machine right on the truck, and a large diameter flexible hose or tube extensible from the truck to any garbage receptacle or can, with adapter collar means on the end of the hose or tube to fit over the garbage receptacle or can, and on producing this very strong vacuum all the garbage is immediately suctioned out of the can and into the truck, without spillage of any garbage onto the street.

Still another object of the invention is to provide a novel and improved garbage removal truck and accessory suction device, which is simple in design, and which can be adapted to and mounted on most garbage removal trucks, at low cost and with expectation of long life due to rugged construction.

The above and other objects and advantages of the invention will become apparent from the following description of a preferred embodiment thereof, as illustrated in the accompanying drawing, forming a part hereof.

In the drawing:

FIG. 1 is a side elevational view of the garbage removal truck with its suction hose in extended operative position for removal of garbage from a receptacle.

In connection with the problems of maintaining cleanliness especially in cites and other crowded urban areas, it is of utmost importance that garbage and other trash not be allowed to remain exposed to the ambient air, to avoid air pollution, noxious odors, and attraction of vermin, rodents and the like thereto. For this purpose, garbage cans are usually provided, some being disposed in sunken pits with metal covers on them to keep them covered up, garbage being dumped into them from time to time, or swept into them from the cleaning of the streets.

With the recent introduction of wire trash baskets on the streets to encourage persons to discard their trash therein, it has happened that these trash baskets become a source of pollution as persons instead of merely throwing cigarette butts and papers into them, are also dumping real garbage into them and thus create a real problem. Hence they are from time to time emptied into garbage receptacles or cans which may be merely large metal covered cans on the sidewalk, or very large cans in garbage pits below. In any event, they all have to be emptied from time to time. The present invention provides a solution to these many problems.

In order to understand clearly the nature of the invention and the best means for carrying it out, reference may be had to the drawing, in which numerals denote the various parts as described herein.

As shown, there is a large garbage removal truck 10 with traction wheels 12 and 14 for riding on the roadway 16. There is the usual drivers cab 18 for the driver and operator of the truck and for the crew. A large garbage receiving housing chamber is shown at 20 and it has a rear door 22 for removal of garbage therefrom later at the dump.

A hydraulic door closer is shown at 24 and this may also be used to compact the contents of the truck as it fills up. At the forward portion of the truck there is a suction fan housing 26 containing a rotary suction fan 27 on a shaft 28 and driven by a connection to the vehicle engine or by a separate engine carried in the truck. The suction fan 27 thus produces a very strong suction at the suction inlet coupling 30, and the garbage delivery end 32 of the suction hose 34 is coupled thereto.

The garbage suctioning hose 34 may be of a large diameter, such as about a foot or more in diameter, and is formed of reinforced rubber or plastic covered spiral wound heavy wire or the like, so as to avoid any leakage of air into the hose, and yet allow the hose to be flexible enough for the purpose, the interior being smoothly lined with plastic to prevent any garbage from being caught inside the hose, and to allow for easy flushing out with water when the work is over, by opening plug 36 and attaching a water flushing hose thereto.

As shown, the main suction hose 34 is quite long and flexible, so that its intake end 40 can be moved right over the manhole containing the garbage receptacle 42, after the usual manhole cover 44 has been removed and moved over on the road. The suction hose 34 has a fitting ring collar 46 to fit closely over the manhole to prevent spillage of suctioned garbage, and has a sizable suction intake nozzle 48 which extends right inside the manhole to pick up the suction garbage for feeding through the hose and into the truck chamber.

A handle 50 is clamped to the hose as shown, to allow the ground worker to guide its nozzle right inside the manhole without delay. A hydraulic hoist cylinder and piston 52 is secured at its right end to the base collar 54, with its piston 56 clamped at 58 to the hose extension and retraction hydraulic cylinder 60 which is also secured at its right and to the base collar 54. The plunger 62 is secured at its outer end 64 to the collar clamp 66 around the hose at this intermediate location for extending and retracting the suction hose to be easily located at its nozzle intake end over the manhole 42.

The cabinet 68 which contains the various controls and some motors and pumps as needed, is controlled by a control panel 70 which has several push buttons to regulate what is being done, such as to start the suction motors, regulate their speed, operate the pumps for the hydraulic cylinders 52 and 60 to left and extend or retract the hose, and other functions. The hydraulic cylinders are supplied with fluid under pressure through fluid hoses as at 72.

While the control panel 70 is shown mounted right on the cabinet 68, it is also understood that a remote control panel which is a duplicate of panel 70 may be mounted on the end of a flexible cable reaching to the sidewalk or roadway, so that a sanitation man walking along the road can control the operation as the truck arrives at each manhole. The intake nozzle 48 is one form which may be used, but other shapes of nozzles may also be used instead, depending on what is being handled. After a manhole is cleaned out, the fans may be reversed to blow out the manhole and remove any stagnant odors therein, and even to blow in some pesticide to kill any vermin or pests which may enter, and a germmicide also.

A large bracket may be installed on the roof of the truck, or on the side, for holding the hose when the truck is moving along the road, to avoid swinging and hitting other vehicles.

From the above, it is seen that this invention provides an improved means for handling garbage, which will save at least 75 percent of need for trucks, and at least 50 percent of need for labor. Further it may be expected to save a large percentage of need for gas or fuel, and will lessen the congestion of highways for these trucks will move about quickly and get out of the way of traffic. Further it will avoid undue noise, pollution, and aid in elimination of vermin and pests in all areas, and thus will decrease the cost of handling garbage, and increase cleanliness, efficiency, economy, productivity, and resultant saving in taxes.

Although the invention has been described in specific terms, it is understood that various changes may be made in size, shape, materials and arrangement without departing from the spirit and scope of the invention as claimed.

Having herein described the invention, what is claimed as new is:

1. In a garbage handling device for use with a garbage truck having a garbage receiving chamber and an elongated suction hose for receiving at one end garbage to be handled, and for discharging at the hose outlet end such garbage into the garbage receiving chamber of the truck, including suction producing means for producing suction in said suction hose for drawing garbage into and through said hose, hose positioning means for moving and positioning said hose for garbage intake, said suction producing means comprising a rotary fan coupled to said garbage suction hose for producing suction therein so as to suction garbage into the intake end of said hose from a source of garbage and for conveying said garbage along the length of said hose and into said truck chamber, the improvement wherein said hose positioning means comprises a first hydraulic cylinder and piston means, a collar, the collar being fixedly secured to the outside surface of the hose at a point intermediate the intake end and the other end of the hose, a portion of said first hydraulic cylinder being disposed secured to the truck, a portion of said second hydraulic cylinder being disposed secured to the truck, the free end of said piston means of said first hydraulic cylinder being disposed secured to said collar, the free end of said piston means of said second hydraulic cylinder being disposed secured to another portion of said first hydraulic cylinder, said hose positioning means for moving said hose in a retracted position on the truck when the truck is travelling or is not in use to thereby avoid dangling of said suction hose from the truck and the causing of accidental collisions.

* * * * *